(12) United States Patent
Thommana et al.

(10) Patent No.: US 9,887,768 B1
(45) Date of Patent: Feb. 6, 2018

(54) TACTICAL SPECTRUM HARVESTING

(75) Inventors: John Thommana, Cedar Rapids, IA (US); Lizy Paul, Cedar Rapids, IA (US); Roy C. Moore, Cedar Rapids, IA (US); Neil R. Coonrod, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 923 days.

(21) Appl. No.: 12/456,281

(22) Filed: Jun. 15, 2009

(51) Int. Cl.
*H04B 17/00* (2015.01)
*H04B 7/26* (2006.01)
*H04B 17/391* (2015.01)

(52) U.S. Cl.
CPC ......... *H04B 7/2696* (2013.01); *H04B 17/391* (2015.01); *H04B 2201/692* (2013.01)

(58) Field of Classification Search
None
See application file for complete search history.

(56) References Cited

U.S. PATENT DOCUMENTS

| | | | | |
|---|---|---|---|---|
| 5,610,839 | A * | 3/1997 | Karolak | H04L 41/145 340/7.25 |
| 6,400,928 | B1 * | 6/2002 | Khullar | H04L 1/0003 375/237 |
| 2003/0198200 | A1 * | 10/2003 | Diener | H04L 1/1664 370/329 |
| 2003/0224741 | A1 * | 12/2003 | Sugar et al. | 455/115.1 |
| 2004/0023674 | A1 * | 2/2004 | Miller | 455/462 |
| 2004/0137849 | A1 * | 7/2004 | Kloper et al. | 455/67.11 |
| 2004/0203474 | A1 * | 10/2004 | Miller et al. | 455/69 |
| 2004/0203826 | A1 * | 10/2004 | Sugar et al. | 455/452.1 |
| 2007/0042733 | A1 * | 2/2007 | Tomioka | 455/179.1 |
| 2007/0096847 | A1 * | 5/2007 | Trutna et al. | 333/133 |
| 2007/0218931 | A1 * | 9/2007 | Beadle et al. | 455/502 |
| 2008/0101284 | A1 * | 5/2008 | Buchwald et al. | 370/329 |
| 2008/0291985 | A1 * | 11/2008 | Adnani et al. | 375/220 |
| 2008/0293353 | A1 * | 11/2008 | Mody et al. | 455/1 |
| 2009/0073870 | A1 * | 3/2009 | Haartsen et al. | 370/216 |
| 2010/0144357 | A1 * | 6/2010 | Chaudhri et al. | 455/450 |
| 2010/0240407 | A1 * | 9/2010 | Park et al. | 455/512 |

* cited by examiner

*Primary Examiner* — Zhiyu Lu
(74) *Attorney, Agent, or Firm* — Angel N. Gerdzhikov; Donna P. Suchy; Daniel M. Barbieri

(57) ABSTRACT

The present invention is a method for tactical spectrum harvesting via a cognitive communication device. The method may include monitoring a wireless communication frequency spectrum. The method may further include detecting active net communication transmissions. The active net communication transmissions may be transmitted via the monitored communication frequency spectrum by a plurality of active transmitting nets. The method may further include determining an identity of/identifying at least one active transmitting net included in the plurality of active transmitting nets. The method may further include synchronizing an internal time reference of the cognitive communication device with a time reference(s) of the identified active transmitting net(s). The method may further include determining an estimated future spectral occupancy for the identified active transmitting net(s) based on time data for the active net communication transmissions, cryptographic key data for the active transmitting nets, and algorithm data for the active transmitting nets.

14 Claims, 2 Drawing Sheets

TACTICAL SPECTRUM HARVESTING

FIELD OF THE INVENTION

The present invention relates to the field of software defined radio (SDR), (including waveforms) and particularly to methods for providing tactical spectrum harvesting.

BACKGROUND OF THE INVENTION

A number of currently available spectrum harvesting techniques may not provide desired results.

Thus, it would be desirable to provide methods for providing spectrum harvesting which obviate the above-referenced problems associated with currently available spectrum harvesting techniques.

SUMMARY OF THE INVENTION

Accordingly, an embodiment of the present invention is directed to a method for tactical spectrum harvesting via a cognitive communication device, including: monitoring a wireless communication frequency spectrum; detecting active net communication transmissions, said active net communication transmissions being transmitted via the monitored communication frequency spectrum by a plurality of active transmitting nets; determining an identity of at least one active transmitting net included in the plurality of active transmitting nets, thereby identifying the at least one active transmitting net included in the plurality of active transmitting nets; synchronizing an internal time reference of the cognitive communication device with a time reference of the at least one identified active transmitting net included in the plurality of active transmitting nets; and determining an estimated future spectral occupancy for the at least one identified active transmitting net included in the plurality of active transmitting nets based on time data for the active net communication transmissions, cryptographic key data for the plurality of active transmitting nets, and algorithm data for the plurality of active transmitting nets.

An additional embodiment of the present invention is directed to a method for tactical spectrum harvesting via a cognitive communication device, including: monitoring a wireless communication frequency spectrum; detecting active net communication transmissions, including detecting preambles of said active net communication transmissions, said active net communication transmissions being transmitted via the monitored communication frequency spectrum by a plurality of active transmitting nets; determining an identity of at least one active transmitting net included in the plurality of active transmitting nets, thereby identifying the at least one active transmitting net included in the plurality of active transmitting nets; synchronizing an internal time reference of the cognitive communication device with a time reference of the at least one identified active transmitting net included in the plurality of active transmitting nets; and determining an estimated future spectral occupancy for the at least one identified active transmitting net included in the plurality of active transmitting nets based on time data for the active net communication transmissions, preamble detection data for the active net communication transmissions, cryptographic key data for the plurality of active transmitting nets, and algorithm data for the plurality of active transmitting nets.

A further embodiment of the present invention is directed to a computer program product, including: a signal-bearing medium bearing one or more instructions for performing a method for performing tactical spectrum harvesting via a cognitive communication device, said method including: monitoring a wireless communication frequency spectrum; detecting active net communication transmissions, said active net communication transmissions being transmitted via the monitored communication frequency spectrum by a plurality of active transmitting nets; determining an identity of at least one active transmitting net included in the plurality of active transmitting nets, thereby identifying the at least one active transmitting net included in the plurality of active transmitting nets; synchronizing an internal time reference of the cognitive communication device with a time reference of the at least one identified active transmitting net included in the plurality of active transmitting nets; and determining an estimated future spectral occupancy for the at least one identified active transmitting net included in the plurality of active transmitting nets based on time data for the active net communication transmissions, cryptographic key data for the plurality of active transmitting nets, and algorithm data for the plurality of active transmitting nets.

A still further embodiment of the present invention is directed to a computer program product, including: a signal-bearing medium bearing one or more instructions for performing a method for performing tactical spectrum harvesting via a cognitive communication device, said method including: monitoring a wireless communication frequency spectrum; detecting active net communication transmissions, including detecting preambles of said active net communication transmissions, said active net communication transmissions being transmitted via the monitored communication frequency spectrum by a plurality of active transmitting nets; determining an identity of at least one active transmitting net included in the plurality of active transmitting nets, thereby identifying the at least one active transmitting net included in the plurality of active transmitting nets; synchronizing an internal time reference of the cognitive communication device with a time reference of the at least one identified active transmitting net included in the plurality of active transmitting nets; and determining an estimated future spectral occupancy for the at least one identified active transmitting net included in the plurality of active transmitting nets based on time data for the active net communication transmissions, preamble detection data for the active net communication transmissions, cryptographic key data for the plurality of active transmitting nets, and algorithm data for the plurality of active transmitting nets.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
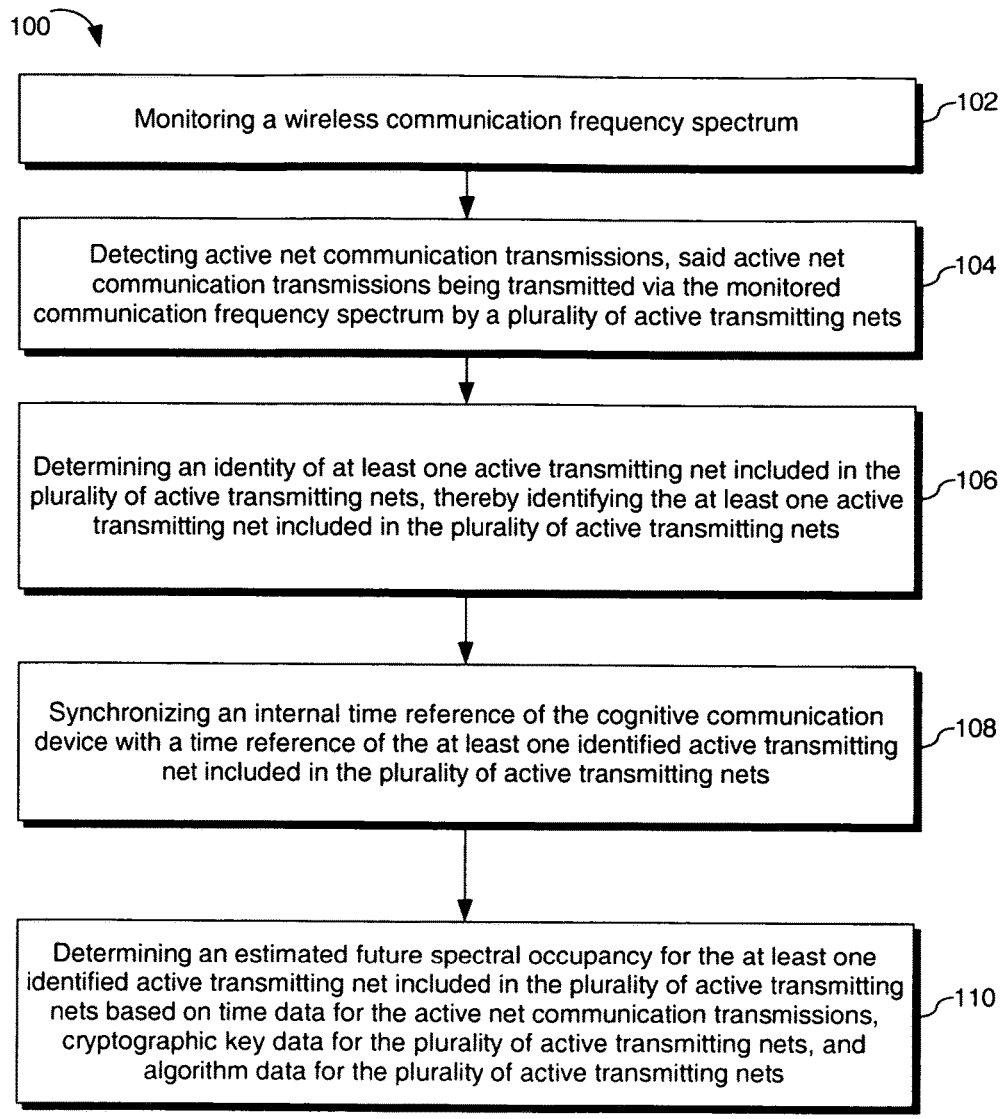
FIG. 1 is a flowchart illustrating a method for tactical spectrum harvesting via a cognitive communication device in accordance with an exemplary embodiment of the present invention.

Dynamic spectrum harvesting is one of the key applications targeted by cognitive radios. A number of dynamic spectrum harvesting applications may be targeted for benign applications, such as re-use of spectrum in television (TV) bands, spectrum sharing between cellular and Worldwide Interoperability for Microwave Access (WiMax), etc. The presence of a large number of mobile frequency hoppers utilizing spectrum over a wide band makes it very difficult for a cognitive radio to operate if the operating guidelines of cognitive radios are followed, namely: that the primary communicator has full rights to the spectrum and has priority of operation; that the secondary communicator has to be able to detect the primary communicator with a receive sensitivity much greater than that of primary receivers; that if the primary communicator is detected, then secondary communicator(s) have to create a no-talk zone around the primary communicator and none of the secondary communicators transmissions may invade the no-talk zone, in order to prevent interference to/with the primary receivers. The above-referenced/previous condition places a limit on the transmit power of the secondary communicator, which is dependent on the transmit power of the primary communicator. Further, if the primary communicator is detected in the middle of a secondary communication, then the secondary communicator has to vacate the band occupied by the primary communicator within a prescribed band abandon time. Once the band abandon time is over, the secondary communicator cannot interfere with the primary communicator.

The above-mentioned operating guidelines may place a huge restriction on the operation of secondary communicators in a tactical environment due to a number of reasons. First, commercial cognitive radio techniques may be based on the presence of a single non-mobile primary communicator like TV transmitters. In contrast, tactical communications may involve multiple highly mobile primary communicators. Second, commercial cognitive radio techniques may be based on the presence of a non-hopping primary communicator like TV transmitters. In contrast, tactical communications may involve frequency-hopped primary communicators. Further, commercial cognitive radio techniques may be based on the premise that spectrum occupancy history is valid for a short duration in the future. In contrast, tactical communications may use a pseudo-random hopping pattern. Thus, past spectrum occupancy may not accurately predict future spectrum occupancy. Also, with tactical communications, predictability may deteriorate even faster in the presence of multiple simultaneous hopping nets, which are a reality in tactical environments.

The above-mentioned operating guidelines may place a huge restriction on the operation of secondary communicators in a tactical environment due to a number of additional reasons. First, commercial cognitive radio techniques may be based on the difference in transmit power between primary (ex.—100 kilowatt (kW) TV transmitter) communicators and secondary (ex.—100 watt (W) WiMax base station transmitter; 2 watt (W) WiMax handset transmitter) communicators. In contrast, tactical communications may require secondary communicators to transmit at similar power levels as that of a primary communicator. Second, commercial cognitive radio techniques may be based on the premise that each burst has a short synchronizing pre-amble. Further, with commercial cognitive radio techniques, loss of reception of occasional bursts will not deteriorate communications substantially. In contrast, tactical communications, especially legacy systems, typically are used for speech communications and may use a synchronizing preamble, followed by preamble-less data bursts. In tactical communications, if a receiver cannot lock onto the preamble, then the preamble-less data bursts which follow cannot be decoded. Since the preamble and cryptographic synchronization generally occupies a large portion of each communication burst, and, since tactical communications are often short and bursty, there may be a higher probability that a sense and use approach will interfere with the preamble, rather than the preamble-less data portion. The interference probability may increase with the number of active nets. Finally, commercial cognitive radio techniques may be based on the fact that secondary communicators have coordinated silent sensing periods for detecting the primary communicator. Tactical communications may also need coordinated silent sensing periods to detect primary communicators, but a jammer may easily predict coordinated non-energy silence and may put energy in the bands during the sensing period to make cognitive sense and use a failure.

In tactical communications, the presence of varying power transmitters (hand-held, airborne, maritime, etc.) having varying mobility and operating at varying altitudes, may prevent the accurate estimation of the no-talk zone. Further, the frequency-hopped nature may prevent the determination of when the primary communicator will use the channel. The above-mentioned considerations point to the pitfalls of using commercial spectrum scavenging techniques in tactical environments. However, this does not negate the benefits of being able to re-use unused spectrum in tactical communication bands. Exemplary embodiments of the present invention may provide a spectrum scavenging/spectrum harvesting scheme that is feasible in the tactical communication bands/tactical environments, without interfering with legacy tactical communication systems. In a number of embodiments of the present invention, commercial scavenging schemes may need to be run in the background to avoid non-hopping commercial or tactical devices operating in the band.

Tactical communications may use TRANSEC (Transmission Security) schemes to separate users in time, frequency, and spatial domains. The TRANSEC scheme may use pseudo-random transmission security keys that are manipulated by cryptographic algorithms to ensure that transmission bursts have a low probability of being detected, intercepted and exploited. Most of the tactical waveforms are frequency hopped waveforms that use pseudo-random keys to determine on which frequency the next communication burst will be transmitted. Only receivers with implicit knowledge of the accurate time, cryptographic key and the algorithm used can predict the burst in time and frequency.

All users that need to communicate with each other are grouped into units called nets that are identified by a unique net identifier. All members of a net have the same time reference and use a common key and algorithm in order to be synchronized.

Tactical communication devices are filled (input) with net identifiers and operating details that users of the tactical communication devices will need. The user, by selecting the appropriate operational network, forces the tactical communication device to be synchronized with other members of the net, thereby enabling the user of the tactical communication device to communicate with all members of the net.

Current tactical frequency hopped waveforms/frequency hoppers may be classified into two types:

the first type are waveforms whose next frequency hop can be predicted by knowing accurate time, cryptographic key and algorithm used.

the second type are waveforms whose next frequency hop can be predicted by knowing accurate time, start time of communication burst, cryptographic key and algorithm used.

In order for cognitive communication devices to operate seamlessly with the above mentioned types of frequency hoppers, probabilistic spectrum management techniques based on spectrum sensing are insufficient.

Reference will now be made in detail to exemplary embodiments of the present invention, examples of which are illustrated in the accompanying drawings.

For the purpose of illustration, consider the tactical UHF spectrum (225-400 MHz). There are approximately 7000 25 kHz channels in this band. One can potentially create a large number of nets each having approximately 40 channels. The actual number of nets depends on the fact whether the nets are orthogonal to each other. For the illustration assume that there are 50 possible nets and of the 50 possible nets 20 nets are active in the theatre of operation.

The prevailing spectrum harvesting technique would have scanned the 225-400 MHz repeatedly looking for spectral occupancy. It would have maintained an occupancy histogram to make probabilistic spectrum availability predictions.

In our embodiment, the cognitive communication device will have details of all the 50 nets. The spectrum sensing algorithm will give a periodic spectrum occupancy status and an occupancy histogram. Knowledge of TRANSEC algorithm permits the cognitive engine to compute the next frequency hop for all 50 nets. The two sets of information are then reconciled in real-time to determine the presence of active nets. As time passes all nets that are active along with all fixed non-hopping users would have been identified. The time uncertainty will give rise to a multi-branch tree for each net, the branches of which will get pruned as the time uncertainty is resolved.

After the active nets are resolved, the cognitive engine is free to re-use any of the unused nets or extract frequency bins from the unused nets synchronized in time. The secondary communicators periodically monitor the spectrum to ensure that a primary net using the net exploited by the secondary users has not been activated.

Referring to FIG. 1, a flowchart illustrating a method for tactical spectrum harvesting/a method for providing spectrum harvesting in a tactical environment, via a cognitive communication device/cognitive communication system (ex.—a first cognitive communication device), in accordance with an exemplary embodiment of the present invention is shown. For instance, the cognitive communication device may be a radio communication device, a software-defined radio (SDR), a dynamic spectrum-sensing software-defined radio, a cognitive radio (ex.—an ARC-210), or the like. Further, the cognitive radio may be a handheld radio, a vehicle-mounted radio, a mobile radio, an on-board radio (ex.—an on-board radio which is implemented on-board an airplane, ship, train, etc.) or the like.

In an exemplary embodiment of the present invention, a network/net of cognitive communication device(s) may be configured for monitoring a frequency spectrum and characterizing energy detected in the monitored frequency spectrum/monitored band in real-time. The cognitive communication device(s) may be filled/input with details of all net identifiers operating in the vicinity of operation (ex.—fill data). By correlating the presence of energy in specific bands of the monitored spectrum with an accurate time of detection and information from the fill data, the cognitive communication device(s) may narrow down/may ascertain which nets are currently operating and may correct/synchronize an internal time reference(s) of the cognitive communication device(s) with time references of the observed nets. The cognitive communication device(s) of the present invention may use modulation detection and other cyclostationary detection techniques to further identify the type of frequency hopped waveform. By being time synchronized with the various observed nets and knowing the cryptographic key(s) and algorithm(s) being used, the cognitive communication device(s) of the present invention may be configured for predicting spectral occupancy of the nets in use at a time in the future. The presence of non-hopping communicators may be detected and eliminated from the analysis. Further, the cognitive communication device(s) of the present invention may have the right to utilize the spectrum only if primary users (ex.—users licensed for using said spectrum/bands) are not using the spectrum.

In an exemplary embodiment of the present invention, the method 100 may include the step of monitoring a wireless communication frequency spectrum 102. For instance, the cognitive communication device/cognitive radio may be implemented in a tactical environment and may be communicatively coupled to a plurality of additional cognitive radios as part of a first wireless network/net. In current embodiments of the present invention, each cognitive radio of the first wireless net may be a secondary communication device/secondary communicator/secondary user with regards to the spectrum. For instance, each of the cognitive radios of the first net may have a second priority of usage of the spectrum (ex—may not be licensed to use the spectrum). In contrast, a second network/net may include one or more communication devices/nodes, each node being a primary communication device/primary communicator/primary node/primary user with regards to the spectrum. For instance, each of the communication devices/nodes of the second net may have a first priority of usage of the spectrum (ex—be licensed to use the spectrum). Further, with regards to the spectrum, the first priority of usage is greater/higher priority/takes precedence over the second priority of usage. Thus, the second net (ex.—the primary communicator net) has priority over the first net (ex.—the secondary communicator net) regarding access to the spectrum. For instance, if a cognitive device/cognitive communication device of the first net (ex. —a secondary communicator) communicates via the spectrum/accesses a communication band of the spectrum and a node/communication device of the second net (ex.—a primary communicator) begins a communication via said communication band during the secondary communicator's communication, the secondary communicator may abandon/vacate/end the communication, so as to avoid/minimize further interruption or conflict with the primary communicator's communication. Thus, spectrum harvesting methods of the present invention are directed at locating/determining/estimating communication bands of the spectrum via which and times during which said cognitive radios may communicate without having communications by the cognitive radio(s) of the first net (ex.—the secondary communicators) conflict with/interrupt/overlap/concurrently occur on the same communication band(s) with communications by the nodes/communication devices of the second net (ex.—the primary communicators).

As discussed above, the method 100 may include the step of monitoring a wireless communication frequency spectrum 102. Thus, the cognitive radio(s) of the first network/net (ex.—the secondary communicators) may be configured for determining if primary communicators (of a second net, third net, etc.) are detected on the spectrum (ex.—on communication band(s) of the spectrum). In current embodiments of the present invention, the method 100 may further include the step of detecting active net communication transmissions/active node communication transmissions, said active net communication transmissions being transmitted via the monitored communication frequency spectrum by a plurality of active transmitting nets (ex.—mobile, frequency-hopping nets) 104. For example, the cognitive radio device(s) of the first network may be configured for detecting active net communication transmissions which are transmitted by nodes participating in a plurality of active nets/primary communicator nets via the wireless frequency spectrum.

In further embodiments of the present invention, the method 100 may further include determining an identity of at least one active transmitting net included in the plurality of active transmitting nets, thereby identifying the at least one active transmitting net included in the plurality of active transmitting nets 106. In exemplary embodiments, the method 100 may further include synchronizing an internal time reference of the cognitive communication device with a time reference of the at least one identified active transmitting net included in the plurality of active transmitting nets 108.

In additional embodiments of the present invention, the method 100 may further include determining an estimated future spectral occupancy for the at least one identified active transmitting net included in the plurality of active transmitting nets based on time data for the active net communication transmissions, cryptographic key data for the plurality of active transmitting nets, and algorithm data for the plurality of active transmitting nets 110. In exemplary embodiments, the step of determining an estimated future spectral occupancy for the at least one identified active transmitting net may include determining an estimated frequency for a future transmission burst and an estimated start time of the future transmission burst for the at least one identified active transmitting net. In further embodiments, time data may include accurate times of transmission for the active net communication transmissions. In still further embodiments, the estimated future spectrum occupancy may be determined based on authorized frequency data for the plurality of active transmitting nets (ex.—said authorized frequency data may include hopset data). In additional embodiments, the estimated future spectral occupancy may be determined based on spectral energy history data for the plurality of active transmitting nets. In further embodiments, the estimated future spectral occupancy may be determined based on modulation detection data for the plurality of active transmitting nets. In still further embodiments, the estimated future spectral occupancy may be determined based on net identifier data for the plurality of active transmitting nets. In additional embodiments, the time data, cryptographic key data, algorithm data, authorized frequency data, spectral energy history data, modulation detection data, and net identifier data may be stored in a memory/memories of the cognitive communication device(s), may be updated and may be exchanged/shared (ex.—such as with other cognitive communication device(s) within the same net to synchronize the devices of the net with each other).

Figure 2:
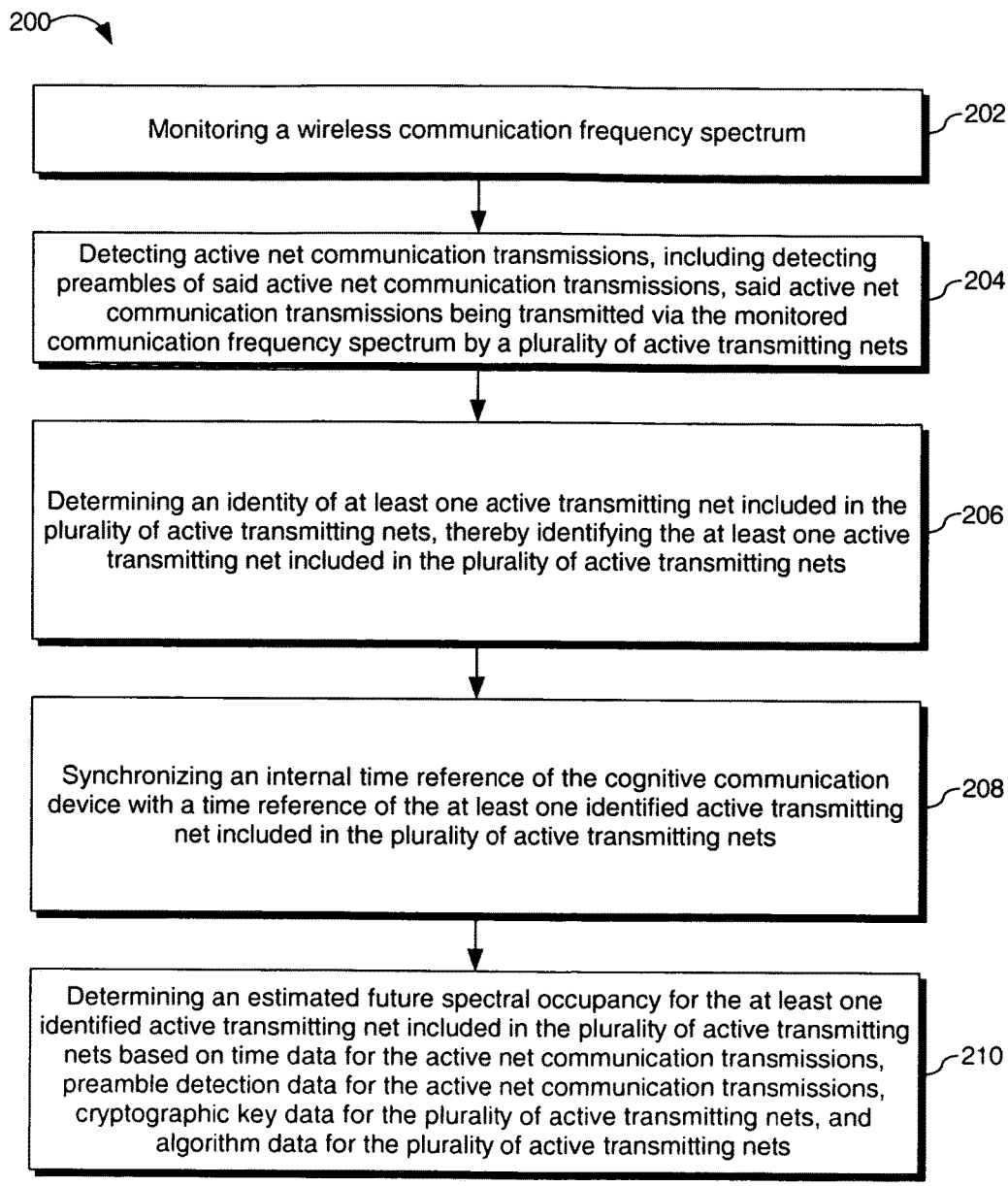
FIG. 2 is a flowchart illustrating a method for tactical spectrum harvesting via a cognitive communication device in accordance with a further exemplary embodiment of the present invention.

In an alternative embodiment, in order to detect the presence of the above-referenced second type of frequency hopper, a cognitive communication device may be required to be able to determine when a communication burst has started by detecting a start of a burst via preamble detection. By correlating the presence of energy in specific bands with an accurate time of detection, time of preamble detection and information from the fill data, the cognitive communication device of the present invention may be able to determine (ex.—by narrowing down via process of elimination) the nets that are currently operating. and may correct/synchronize an internal time reference(s) of the cognitive communication device(s) with time references of the observed nets. The cognitive communication device(s) of the present invention may use modulation detection and other cyclostationary detection techniques to further identify the type of frequency hopped waveform. By being time synchronized with the various observed nets and knowing the cryptographic key(s) and algorithm(s) being used, the cognitive communication device(s) of the present invention may be configured for predicting spectral occupancy of the nets in use at a time in the future. The presence of non-hopping communicators may be detected and eliminated from the analysis. Further, the cognitive communication device(s) of the present invention may have the right to utilize the spectrum only if primary users (ex.—users licensed for using said spectrum/bands) are not using the spectrum. Referring to FIG. 2, a flowchart illustrating a method for tactical spectrum harvesting/a method for providing spectrum harvesting in a tactical environment, via a cognitive communication device/cognitive communication system (ex.—a first cognitive communication device), in accordance with an alternative exemplary embodiment of the present invention is shown. The method 200 may include the step of monitoring a wireless communication frequency spectrum 202. The method 200 may further include detecting active net communication transmissions, including detecting preambles of said active net communication transmissions, said active net communication transmissions being transmitted via the monitored communication frequency spectrum by a plurality of active transmitting nets 204.

In exemplary embodiments, the method 200 may further include determining an identity of at least one active transmitting net included in the plurality of active transmitting nets, thereby identifying the at least one active transmitting net included in the plurality of active transmitting nets 206. In further embodiments, the method 200 may further include synchronizing an internal time reference of the cognitive communication device with a time reference of the at least one identified active transmitting net included in the plurality of active transmitting nets 208. The method 200 may further include determining an estimated future spectral occupancy for the at least one identified active transmitting net included in the plurality of active transmitting nets based on time data for the active net communication transmissions, preamble detection data for the active net communication transmissions, cryptographic key data for the plurality of active transmitting nets, and algorithm data for the plurality of active transmitting nets 210. In exemplary embodiments, predicting future spectral occupancy for the at least one identified active transmitting net includes determining an estimated frequency for a future transmission burst and an estimated start time of the future transmission burst for the at least one identified active transmitting net. Further, the transmitting node/primary communicator may have a higher priority of usage of the spectrum than the first cognitive communication device/secondary communicator. In current embodiments of the present invention, for waveforms such as SINCGARS, a wideband spectral sensor of the first cognitive communication device/secondary communicator, with the traditional fill of hopsets and time may be lacking only the start of transmission time/the estimated data burst transmission start time to accurately determine when and where in the band said burst(s) will be transmitted. Thus, the first cognitive communication device/secondary communicator may include/implement a cyclostationary detector/feature detector configured for running in the background to detect preambles of node/primary communicator transmissions and to compute for short intervals (ex.—1 to 10 seconds) into the future where each active net/primary communicator is going to place its bursts.

The tactical spectrum harvesting techniques may promote detection of variable speed movers and devices/active nets operating at variable altitudes. When the cognitive communication device(s)/secondary communicators) is/are ARC-210's, majority of use may be above ground, thus, there is a very high probability of detecting active nets in a very short time due to longer reach. Use of airborne assets may also make active net/primary communicator identification easier. Since the cognitive communication device(s)/secondary communicator(s) is/are not planning to use bands allocated to active nets when the nets are not using them temporarily, there may be no need to exchange active nets information among all secondary communicators. Even if such active nets information is exchanged/distributed, the amount of information disseminated may be very small compared to exchanging spectral occupancy information among all secondary communicators in wide frequency bands of the order of 50-250 Megahertz (MHz). In further embodiments, a simple rendezvous scheme based on maximum opportunity in a contiguous 5 MHz band within the band of operation may be used by the secondary communicator(s), since this may be easily computable by all secondary communicators once the active nets are identified.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for tactical spectrum harvesting via a cognitive communication device, comprising:

monitoring a wireless communication frequency spectrum via the cognitive communication device, the cognitive communication device having a secondary priority of usage to the tactical spectrum;

detecting active net communication transmissions, said active net communication transmissions being transmitted via the monitored communication frequency spectrum by a plurality of active transmitting nets having a first priority of usage to the tactical spectrum, wherein each particular active transmitting net of the plurality of active transmitting nets utilizes a time reference, a cryptographic key, and a cryptographic algorithm, wherein each particular active transmitting net is a frequency-hopping net, wherein the cognitive communication device operates outside of the plurality of active transmitting nets, and wherein the cognitive communication device is configured with knowledge of the cryptographic key and the cryptographic algorithm utilized by each particular active transmitting net of the plurality of active transmitting nets;

determining an identity of each active transmitting net included in the plurality of active transmitting nets at least by correlating a presence of energy in a particular band of the monitored communication frequency spectrum with a detection time of a particular detected active net communication transmission, thereby identifying every active transmitting net included in the plurality of active transmitting nets;

synchronizing an internal time reference of the cognitive communication device with a time reference of each identified active transmitting net included in the plurality of active transmitting nets to facilitate estimation of future spectral occupancy for each identified active transmitting net of the plurality of active transmitting nets;

determining an estimated future spectral occupancy for each identified active transmitting net of the plurality of active transmitting nets based at least on authorized frequency data for the plurality of active transmitting nets, time data for the active net communication transmissions, spectral energy history data for the plurality of active transmitting nets, and the knowledge of the cryptographic key and the cryptographic algorithm utilized by each identified active transmitting net of the plurality of active transmitting nets, thereby allowing the cognitive communication device to collectively determine estimated future spectral occupancies for every identified active transmitting net included in the plurality of active transmitting nets;

updating the authorized frequency data, the time data, and the spectral energy history data;

storing the updated authorized frequency data, the updated time data, and the updated spectral energy history data in memory; and transmitting the updated authorized frequency data, the updated time data, and the updated spectral energy history data to at least one other cognitive communication device on a same net as the cognitive communication device.

2. The method as claimed in claim 1, wherein determining an estimated future spectral occupancy for each identified active transmitting net includes determining an estimated frequency for a future transmission burst and an estimated start time of the future transmission burst for each identified active transmitting net.

3. The method as claimed in claim 1, wherein the time data includes accurate times of transmission for the active net communication transmissions.

4. The method as claimed in claim 1, wherein the cognitive communication device is a cognitive radio and the at least one other cognitive communication device is at least one other cognitive radio.

5. The method as claimed in claim 1, wherein the authorized frequency data for the plurality of active transmitting nets includes hopset data.

6. The method as claimed in claim 1, wherein the cognitive communication device stores the cryptographic key and the cryptographic algorithm utilized by each particular active transmitting net of the plurality of active transmitting nets in a memory of the cognitive communication device.

7. A method for tactical spectrum harvesting via a cognitive communication device, comprising:
monitoring a wireless communication frequency spectrum via the cognitive communication device, the cognitive communication device having a secondary priority of usage to the tactical spectrum;
detecting active net communication transmissions, including detecting preambles of said active net communication transmissions, said active net communication transmissions being transmitted via the monitored communication frequency spectrum by a plurality of active transmitting nets having a first priority of usage to the tactical spectrum, wherein each active transmitting net of the plurality of active transmitting nets utilizes a time reference, a cryptographic key, and a cryptographic algorithm, wherein each particular active transmitting net is a frequency-hopping net, wherein the cognitive communication device operates outside of the plurality of active transmitting nets, and wherein the cognitive communication device is configured with knowledge of the cryptographic key and the cryptographic algorithm utilized by each active transmitting net of the plurality of active transmitting nets;
determining an identity of each active transmitting net included in the plurality of active transmitting nets at least by correlating a presence of energy in a particular band of the monitored communication frequency spectrum with a detection time of a particular detected active net communication transmission, thereby identifying every active transmitting net included in the plurality of active transmitting nets;
synchronizing an internal time reference of the cognitive communication device with a time reference of each identified active transmitting net included in the plurality of active transmitting nets to facilitate estimation of future spectral occupancy for each identified active transmitting net of the plurality of active transmitting nets;

determining an estimated future spectral occupancy for each identified active transmitting net of the plurality of active transmitting nets based at least on authorized frequency data for the plurality of active transmitting nets, time data for the active net communication transmissions, preamble detection data for the active net communication transmissions, spectral energy history data for the plurality of active transmitting nets, and the knowledge of the cryptographic key and the cryptographic algorithm utilized by each identified active transmitting net of the plurality of active transmitting nets, thereby allowing the cognitive communication device to collectively determine estimated future spectral occupancies for every identified active transmitting net included in the plurality of active transmitting nets, wherein the determining the estimated future spectral occupancy for each identified active transmitting net of the plurality of active transmitting nets including determining an estimated frequency for a future transmission burst and an estimated start time of the future transmission burst for each identified active transmitting net of the plurality of active transmitting nets via a cyclostationary detector of the cognitive communication device;

updating the authorized frequency data, the time data, and the spectral energy history data;

storing the updated authorized frequency data, the updated time data, and the updated spectral energy history data in memory; and transmitting the updated authorized frequency data, the updated time data, and the updated spectral energy history data to at least one other cognitive communication device on a same net as the cognitive communication device.

8. A computer program product, comprising:
a non-transitory, computer-readable medium bearing one or more instructions for performing tactical spectrum harvesting via a cognitive communication device, the instructions comprising:
monitoring a wireless communication frequency spectrum via the cognitive communication device, the cognitive communication device having a secondary priority of usage to the wireless communication frequency spectrum;
detecting active net communication transmissions, said active net communication transmissions being transmitted via the monitored communication frequency spectrum by a plurality of active transmitting nets having a first priority of usage to the wireless communication frequency spectrum, wherein each active transmitting net of the plurality of active transmitting nets utilizes a time reference, a cryptographic key, and a cryptographic algorithm, wherein each particular active transmitting net is a frequency-hopping net, wherein the cognitive communication device operates outside of the plurality of active transmitting nets, and wherein the cognitive communication device is configured with knowledge of the cryptographic key and the cryptographic algorithm utilized by each active transmitting net of the plurality of active transmitting nets;
determining an identity of each active transmitting net included in the plurality of active transmitting nets at least by correlating a presence of energy in a particular band of the monitored communication frequency spectrum with a detection time of a particular detected active net communication transmission, thereby identifying every active transmitting net included in the plurality of active transmitting nets;

synchronizing an internal time reference of the cognitive communication device with a time reference of each identified active transmitting net included in the plurality of active transmitting nets to facilitate estimation of future spectral occupancy for each identified active transmitting net of the plurality of active transmitting nets;

determining an estimated future spectral occupancy for each identified active transmitting net of the plurality of active transmitting nets based at least on authorized frequency data for the plurality of active transmitting nets, time data for the active net communication transmissions, spectral energy history data for the plurality of active transmitting nets, and the knowledge of the cryptographic key and the cryptographic algorithm utilized by each identified active transmitting net of the plurality of active transmitting nets, thereby allowing the cognitive communication device to collectively determine estimated future spectral occupancies for every identified active transmitting net included in the plurality of active transmitting nets;

updating the authorized frequency data, the time data, and the spectral energy history data;

storing the updated authorized frequency data, the updated time data, and the updated spectral energy history data in memory; and transmitting the updated authorized frequency data, the updated time data, and the updated spectral energy history data to at least one other cognitive communication device on a same net as the cognitive communication device.

9. The computer program product as claimed in claim 8, wherein determining an estimated future spectral occupancy for each identified active transmitting net includes determining an estimated frequency for a future transmission burst and an estimated start time of the future transmission burst for each identified active transmitting net.

10. A computer program product, comprising:
a non-transitory, computer-readable medium bearing one or more instructions for performing tactical spectrum harvesting via a cognitive communication device, the instructions comprising:

monitoring a wireless communication frequency spectrum via the cognitive communication device, the cognitive communication device having a secondary priority of usage to the wireless communication frequency spectrum;

detecting active net communication transmissions, including detecting preambles of said active net communication transmissions, said active net communication transmissions being transmitted via the monitored communication frequency spectrum by a plurality of active transmitting nets having a first priority of usage to the wireless communication frequency spectrum, wherein each active transmitting net of the plurality of active transmitting nets utilizes a time reference, a cryptographic key, and a cryptographic algorithm, wherein each particular active transmitting net is a frequency-hopping net, wherein the cognitive communication device operates outside of the plurality of active transmitting nets, and wherein the cognitive communication device is configured with knowledge of the cryptographic key and the cryptographic algorithm utilized by each active transmitting net of the plurality of active transmitting nets;

determining an identity of each active transmitting net included in the plurality of active transmitting nets at least by correlating a presence of energy in a particular band of the monitored communication frequency spectrum with a detection time of a particular detected active net communication transmission, thereby identifying every active transmitting net included in the plurality of active transmitting nets;

synchronizing an internal time reference of the cognitive communication device with a time reference of each identified active transmitting net included in the plurality of active transmitting nets to facilitate estimation of future spectral occupancy for each identified active transmitting net of the plurality of active transmitting nets; and determining an estimated future spectral occupancy for each identified active transmitting net of the plurality of active transmitting nets based at least on authorized frequency data for the plurality of active transmitting nets, time data for the active net communication transmissions, preamble detection data for the active net communication transmissions, spectral energy history data for the plurality of active transmitting nets, and the knowledge of the cryptographic key and the cryptographic algorithm utilized by each identified active transmitting net of the plurality of active transmitting nets, thereby allowing the cognitive communication device to collectively determine estimated future spectral occupancies for every identified active transmitting net included in the plurality of active transmitting nets, wherein the determining the estimated future spectral occupancy for each identified active transmitting net of the plurality of active transmitting nets including determining an estimated frequency for a future transmission burst and an estimated start time of the future transmission burst for each identified active transmitting net of the plurality of active transmitting nets via a cyclostationary detector of the cognitive communication device;

updating the authorized frequency data, the time data, and the spectral energy history data;

storing the updated authorized frequency data, the updated time data, and the updated spectral energy history data in memory; and transmitting the updated authorized frequency data, the updated time data, and the updated spectral energy history data to at least one other cognitive communication device on a same net as the cognitive communication device.

11. The method as claimed in claim 1, wherein the estimated future spectral occupancy is determined further based on modulation detection data and net identifier data for the plurality of active transmitting nets.

12. The method as claimed in claim 1, wherein the cognitive communication device is permitted to use the tactical spectrum after every active transmitting net included in the plurality of active transmitting nets has been identified.

13. The method as claimed in claim 12, further comprising:
periodically monitoring the tactical spectrum to detect whether an inactive net having the first priority of usage to the tactical spectrum has become a new active transmitting net;
vacating communications of the cognitive communication device; and repeating steps of: detecting active net communication transmissions, determining an identity of each currently active transmitting net, synchronizing an internal time reference of the cognitive communication device with a time reference of each identified currently active transmitting net, and determining an estimated future spectral occupancy for each identified active transmitting net of the plurality of currently active transmitting nets, wherein the cognitive communication device is permitted to use the tactical spectrum after every currently active transmitting net has been identified.

14. The method as claimed in claim 1, wherein the estimated future spectral occupancy is determined further based on modulation detection data.

\* \* \* \* \*